US008634795B2

(12) United States Patent
Murphy et al.

(10) Patent No.: US 8,634,795 B2
(45) Date of Patent: Jan. 21, 2014

(54) PACKET ROUTING METHODS AND APPARATUS FOR USE IN A COMMUNICATION SYSTEM

(75) Inventors: James Michael Murphy, Alameda, CA (US); Allan Baw, San Jose, CA (US); Yashodhan Dandekar, Sunnyvale, CA (US); Mark Gallagher, Berkshire (GB)

(73) Assignee: SpiderCloud Wireless, Inc., San Jose, CA (US)

( * ) Notice: Subject to any disclaimer, the term of this patent is extended or adjusted under 35 U.S.C. 154(b) by 369 days.

(21) Appl. No.: 12/603,517

(22) Filed: Oct. 21, 2009

(65) Prior Publication Data

US 2010/0097995 A1    Apr. 22, 2010

Related U.S. Application Data

(60) Provisional application No. 61/107,272, filed on Oct. 21, 2008.

(51) Int. Cl.
*H04M 11/00*    (2006.01)
(52) U.S. Cl.
USPC .......................................................... 455/403
(58) Field of Classification Search
None
See application file for complete search history.

(56) References Cited

U.S. PATENT DOCUMENTS

| 5,654,958 | A  | * | 8/1997  | Natarajan ....................... 370/410 |
| 6,138,022 | A  | * | 10/2000 | Strawczynski et al. ........ 455/445 |
| 6,947,469 | B2 | * | 9/2005  | Anderson et al. .............. 375/141 |
| 7,471,659 | B2 | * | 12/2008 | Huang et al. ................... 370/335 |
| 7,852,817 | B2 | * | 12/2010 | Gallagher et al. ............. 370/338 |
| 7,912,004 | B2 | * | 3/2011  | Gallagher et al. ............. 370/329 |
| 8,005,076 | B2 | * | 8/2011  | Gallagher et al. ............. 370/353 |
| 8,019,331 | B2 | * | 9/2011  | Khetawat et al. ............. 455/422.1 |
| 8,036,664 | B2 | * | 10/2011 | Khetawat et al. .............. 455/436 |
| 2004/0208153 | A1 |   | 10/2004 | Mizell et al. |
| 2005/0286466 | A1 | * | 12/2005 | Tagg et al. ..................... 370/329 |
| 2007/0086382 | A1 | * | 4/2007  | Narayanan et al. ............ 370/331 |
| 2007/0293148 | A1 | * | 12/2007 | Chiang ......................... 455/3.06 |

(Continued)

FOREIGN PATENT DOCUMENTS

| WO | WO-2008/125729 | 10/2008 |
| WO | WO-2009/114643 | 9/2009 |
| WO | WO-2009/132435 | 11/2009 |

OTHER PUBLICATIONS

3GPP: 3rd Generation Partnership Project; Technical Specification Group Radio Access Network; Home (e) NodeB; Network aspects (Release 8), Sep. 3, 2008.

(Continued)

*Primary Examiner* — Fan Ng
(74) *Attorney, Agent, or Firm* — AlbertDhand LLP

(57) ABSTRACT

An access controller is coupled to an access point and receives data packets from connected user equipment. The access controller is configured to perform packet inspection techniques on the received packets to determine if they should be locally switched. In some embodiments, packets destined for a local intranet services may be locally switched to avoid congesting a core network link. In further embodiments, a local connection to the Internet may be used so that locally switched packets can also be directed to the Internet without the use of a core network link. In still further embodiment, in addition to packet inspection techniques, the access controller maintains a state table for the states of connected user equipment. The access controller may use the information in this table to further decide whether to perform local switching techniques.

27 Claims, 8 Drawing Sheets

(56) References Cited

U.S. PATENT DOCUMENTS

| | | | |
|---|---|---|---|
| 2008/0043669 A1* | 2/2008 | Gallagher et al. | 370/329 |
| 2008/0076419 A1* | 3/2008 | Khetawat et al. | 455/435.1 |
| 2008/0123596 A1* | 5/2008 | Gallagher et al. | 370/331 |
| 2008/0130564 A1* | 6/2008 | Gallagher et al. | 370/329 |
| 2008/0137533 A1* | 6/2008 | Russell et al. | 370/230.1 |
| 2008/0137612 A1* | 6/2008 | Gallagher et al. | 370/331 |
| 2008/0181204 A1* | 7/2008 | Gallagher et al. | 370/354 |
| 2009/0190550 A1* | 7/2009 | Giustina et al. | 370/331 |
| 2009/0215429 A1* | 8/2009 | Caldwell et al. | 455/406 |
| 2010/0085884 A1* | 4/2010 | Srinivasan et al. | 370/252 |
| 2010/0085940 A1* | 4/2010 | Murphy | 370/331 |
| 2010/0087148 A1* | 4/2010 | Srinivasan et al. | 455/63.1 |
| 2010/0087149 A1* | 4/2010 | Srinivasan et al. | 455/63.1 |
| 2010/0087221 A1* | 4/2010 | Srinivasan et al. | 455/522 |
| 2010/0093359 A1* | 4/2010 | Gallagher et al. | 455/445 |
| 2010/0105382 A1* | 4/2010 | Gallagher | 455/434 |
| 2011/0205977 A1* | 8/2011 | Gallagher et al. | 370/329 |

OTHER PUBLICATIONS

International Search Report for PCT Application No. PCT/US2009/061560 dated Feb. 9, 2010.

Nortel: "LTE Local Breakout for Home eNB" 3GPP Draft, Kansas City, May 5-9, 2008.

Nortel: "LTE Local Breakout for Home eNB" 3GPP Draft, Prague, Czech Republic, Sep. 30-Oct. 3, 2008.

\* cited by examiner

PACKET ROUTING METHODS AND APPARATUS FOR USE IN A COMMUNICATION SYSTEM

CROSS-REFERENCE TO RELATED APPLICATIONS

This application claims priority from Provisional Application Ser. No. 61/107,272, filed on Oct. 21, 2008, which is hereby incorporated herein by reference in its entirety.

TECHNICAL FIELD

The present invention relates generally to wireless communications, and more particularly, some embodiments relate to methods and apparatus for packet routing in a femtocell network.

DESCRIPTION OF THE RELATED ART

A femtocell is a cellular base station that typically has a smaller cell coverage area than conventional macro cellular systems. Femtocells are typically intended for use in a home or small business and can be useful to extend the reach of cellular service to within a building, structure or other environment where cellular access would otherwise be limited or unavailable. Multiple femtocells can be controlled by a controller that connects to the service provider networks via a broadband communications link.

The femtocell generally mirrors the functionality of a conventional base station in a smaller form factor for indoor deployment. An example UMTS femtocell can contain a Node B, RNC and GPRS Support Node. However, femtocell applicability is not limited to UMTS, and they can be implemented with other standards, including for example GSM, CDMA2000, TD-SCDMA and WiMAX.

User equipment equipped to communicate on such system typically perform circuit switched and packet switched data communications. Typically, a femtocell is configured to forward all communications, both circuit switched and packet switched to the service provider's core network. Accordingly, even if a user equipment were performing packet based communications solely with an internal network element, for example a local intranet data server, packet communications are first transferred to the core network and then back to the local intranet.

BRIEF SUMMARY OF EMBODIMENTS OF THE INVENTION

Embodiments of the present invention are directed toward apparatus and methods for providing local switching for data packets originating within a communications network. An access controller is coupled to an access point and receives data packets from connected user equipment. The access controller is configured to perform packet inspection techniques on the received packets to determine if they should be locally switched. In some embodiments, packets destined for a local intranet services may be locally switched to avoid congesting a core network link. In further embodiments, a local connection to the Internet may be used so that locally switched packets can also be directed to the Internet without the use of a core network link. In still further embodiment, in addition to packet inspection techniques, the access controller maintains a state table for the states of connected user equipment. The access controller may use the information in this table to further decide whether to perform local switching techniques.

In one embodiment, in a cellular communication network having a plurality of access points serving wireless terminals, a method for communicating packet traffic from an access point to a destination node comprises receiving a packet from a wireless terminal at a control node in the network, the packet including data from the wireless terminal in the network, examining packet characteristics and determining based on the examined packet characteristics whether the packet is to be routed to a mobile communication service provider network or to a local intranet, and if the packet is to be routed to the local intranet, routing the packet directly to the local intranet, bypassing the mobile communication service provider network.

In further embodiments, the method further comprises determining whether the first wireless terminal is in a handoff mode and if so, routing the packet to the mobile communication service provider network without examining the packet characteristics. In still further embodiments, the packet characteristics comprise packet state and packet signature, or determining comprises evaluating examined packet characteristics based on prior received and examined packets from the wireless terminal. In other embodiments, the method further comprises when the packet is routed to the local intranet, determining whether the packet is destined for the Internet; and if so reconfiguring the packet such that the packet is routed from the local intranet to the Internet.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Embodiments of the present invention are directed toward apparatus and methods for providing local switching for data packets originating within a communications network. An access controller is coupled to an access point and receives data packets from connected user equipment. The access controller is configured to perform packet inspection techniques on the received packets to determine if they should be locally switched.

Figure 1:
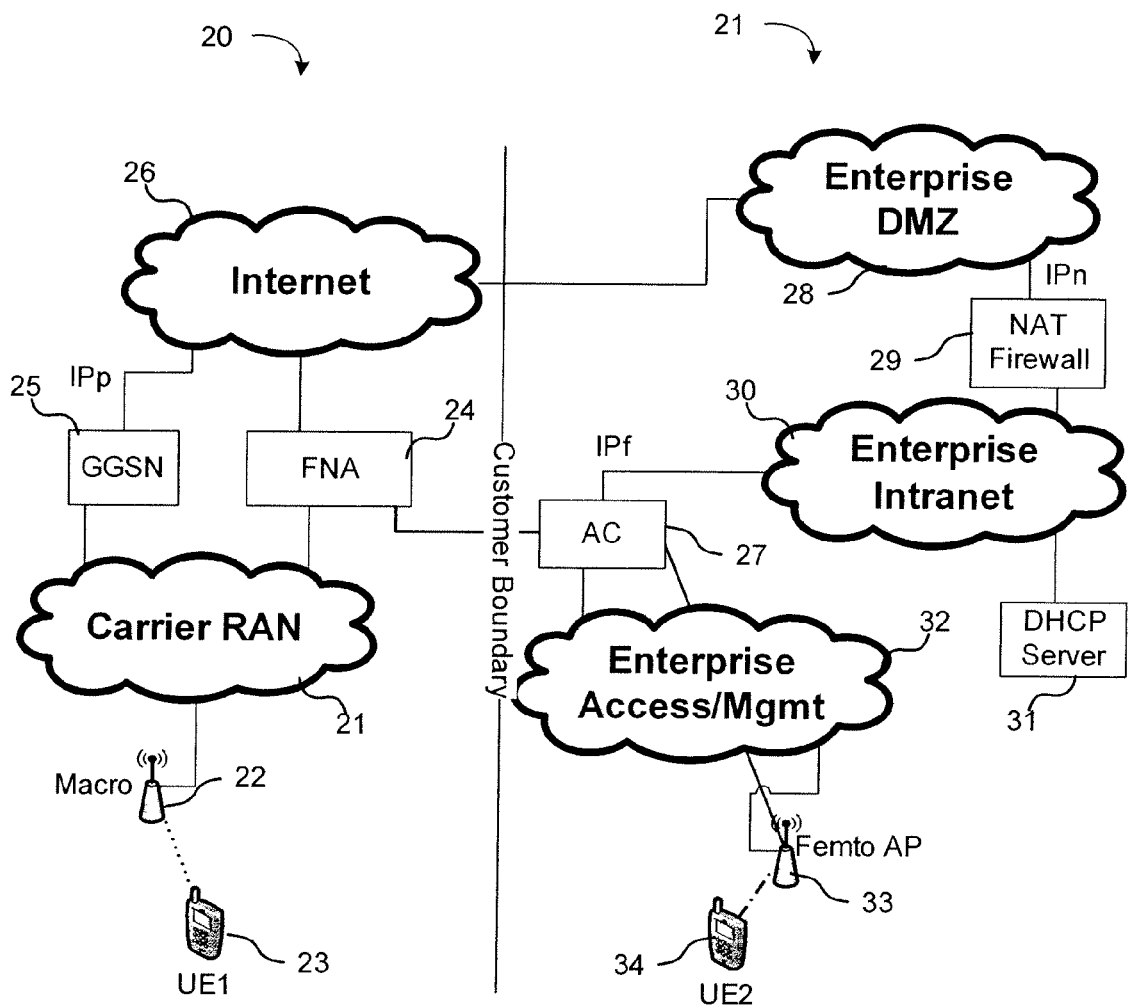
FIG. 1 is a diagram illustrating an example environment in which the invention might be implemented.

Before describing the invention in detail, it is useful to describe an example environment in which the invention can be implemented. One such example is that of a communications network with service provider controlled sectors and customer controlled sectors. FIG. 1 illustrates such an example environment. The example environment comprises a service provider network system. For example, the service provider network system may comprise a 2G or 2.5G network such as GSM, EDGE, IS-95, PDC, iDEN, IS-136, 3G based network such as GSM EDGE, UMTS, CDMA2000, DECT, or WiMAX, or any other cellular or telecommunications or other network.

In the illustrated embodiment, a service provider controlled sector 20 comprises a mobile carrier radio access network 21 comprising one or more macrocells 22. These macrocells provide cellular coverage to connected mobile devices 23, or "user equipment" in UMTS parlance. In some embodiments, mobile devices, or wireless terminals, can include handsets or other user equipment such as, for example cellular phones, smart phones, laptops, handheld communication devices, handheld computing devices, satellite radios, global positioning systems, PDAs, and/or any other suitable device for communicating over the wireless communication system.

Modern mobile devices typically have packet-switched functionality and circuit switched functionality. The packet-switched functionality typically allows the mobile devices to send and receive IP traffic, for example to and from the Internet 26. In the illustrated environment, this functionality is mediated by a support node 25 is connected to the radio access network 21 and to the IP traffic destination, here, Internet 26. In some environments, for example, those employing GSM, support node 25 may be referred to as the GPRS gateway support node (GGSN). Service provider controlled sector 20 further comprises a femtocell node aggregator 24 that mediates the dimensions of one or more customer on femtocells to the core network. In some environments, such as 3G networks, the FNA 24 may comprise a Home NodeB-Gateway (HNB-GW). In particular, FNA 24 provides a core network route to Internet 26 for packet-switched communications originating from, or destined to, mobile devices connected to customer premised femtocells.

The illustrated environment further comprises a customer controlled sector 21. The customer controlled sector 21 comprises a radio access network 32 to provide local cellular coverage to one or more wireless terminals 34 via femtocell access points 33. In the illustrated example, femtocells 33 serve as base stations to provide cellular coverage over an air interface to user equipment 34 within their respective areas of coverage. For example, femtocells 33 may be deployed at various locations within a building or other structure to provide cellular coverage to user equipment 34 within the building or structure. This can be advantageous, for example, in large buildings, underground facilities, within aircraft or other transportation vehicles, and within other structures and locations where conventional macro cell coverage is weak or insufficient. Femtocells can also be deployed in environments where it is desirable to augment the capacity of the conventional macrocellular network. Consider the case of a building with a plurality of femtocells distributed therein. In such an environment, the user equipment 34 registers with a femtocell 33 in its range within the building. As the user moves throughout the building, her cellular handset (or other terminal) may be handed off from one femtocell 33 to another to provide suitable coverage for her user equipment 34 as she moves within the building.

In various embodiments, user equipment 34 may comprise, for example, a cellular or mobile handset, a PDA having cellular system access, a laptop with cellular system access for data transmission over cellular systems, or other devices capable of accessing licensed spectrum communications networks for voice or data transmissions. In such applications, femtocells 33 are wireless access points configured to operate within the licensed spectrum to serve as base stations for the user equipment within their range. In other embodiments, femtocells 33 can be implemented as wireless access points for communications with compatible wireless terminals over proprietary or other non-licensed air interface. Although femtocells 33 are illustrated as exclusively wireless access points, embodiments can be implemented wherein femtocells 33 are implemented with wired interfaces to user equipment or a combination of wired and wireless interfaces.

In the illustrated environment, the femtocells 33 are centrally controlled by a controller 27, sometimes referred to as an access controller. Controller 27 may perform various functions, such as, for example, monitoring operations, coordinating communications among user equipment 34, relaying communications between user equipment 34 and other entities, licensed spectrum allocation, or load balancing amongst the femtocells 33. Femtocells 33 can be connected to access controller 27 via a backhaul 60 which can be implemented using a number of different communication topologies. The connections between the femtocells 33 and the access controller 27 could be dedicated, or the access points and controller could be coupled to one another via a switching network, such as a gigabit Ethernet network, for example. In the illustrated environment, the access controller 27 provides a connection to the FNA 24. This connection allows packet-switched network communications and circuit switched network communications to be routed to the core network 20. In particular, the connection to FNA 24 provides a core network route to Internet 26 for data communications from locally connected user equipment 34.

Access controller 27 also provides a connection to a local IP network, such as the enterprise intranet 30. This connection may be used for a variety of functions. For example, the connection to enterprise intranet 30 provides a route between the FNA 24 and a local dynamic host control protocol server (DHCP) 31 to supply network configuration information for locally connected user equipment 34. Furthermore, the enterprise intranet 30 may have various network elements, such as a network address translation (NAT) firewall 29 and a demilitarized zone subnetwork 28 to provide a local connection to Internet 26. Accordingly, in the illustrated environment a route exists between a locally connected user equipment 34 and the Internet 26.

In some environments controller 27 may comprise a router or switch configured to allow the femtocells 33 to share a network connection and to access networks 30, 26. Controller 27 may also be configured to make routing determinations from among the various entities such that communications with a given wireless terminal 34 may be routed to other entities as may be accessible by controller 27.

From time to time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

For example, the innovations described herein often refer to access points and access controllers. As would be apparent to one of ordinary skill in the art after reading this description depending on the nature of the innovation, various embodiments may implement these components as components of a femtocell network (such as the example described with reference to FIG. 1, or as other access point and controller elements (e.g., base stations and base station controllers) in macro cells, other radio access networks, or other like topologies. Additionally, in peer-to-peer environments, coordination and control mechanisms can be assigned to and distributed amongst the various peer elements, or certain peers may be designated as super peers with additional control mechanisms over the other peers. Super peers can be identified, for example, when the network configuration is mapped and network neighbors identified. Accordingly, access point and access controller functions can, in some embodiments, be distributed amongst peers, delegated to super peers, or shared amongst peers and super peers.

For instance, in standards-based 3GPP HSPA systems (UMTS Release 6), the infrastructure element access point or base station is referred to as a "NodeB," which can be referred to as Home NodeB, or HNB, for femtocell applications, which is known to those of one of ordinary skill in the art familiar with 3GPP systems. The serving NodeB is responsible for allocating a maximum transmit power resource to a wireless terminal (referred to as user equipment, user element or UE in UMTS specifications). In 3GPP LTE (Long Term Evolution) and like systems, uplink power control utilizes a closed-loop scheme around an open-loop point of operation. In 802.16 WiMAX systems, the serving base station is responsible for allocating an OFDMA resource element as well as potentially a maximum transmit power resource to the wireless terminal (called Subscriber Station or SS in the WiMAX specifications). Although many of the examples provided herein are described in terms of a UMTS application, after reading this description one of ordinary skill in the art will understand how these techniques can be implemented in alternative environments.

Although the environments described above can be characterized as a femtocell, macro cellular network or other like topological structure, the methods and apparatus described herein are also well suited to other scenarios, environments and applications, such as a wireless network or a system deployment that has no access controller but comprises distributed wireless access points, which can communicate in a peer-to-peer manner. The innovations described herein are not constrained by the actual choice of wireless protocol technology or network topology, but may be implemented across a wide range of applications as will be appreciated by one of ordinary skill in the art after reading this description.

The innovations described herein are applicable to licensed-spectrum-based cellular technologies in which infrastructure elements such as base stations or access points are provided as entities in the system with some level of coordination. In addition, the innovations are also applicable to unlicensed-spectrum with or without coordinating entities, including, for example, technologies such as WiFi and other technologies that employ peer-to-peer communication techniques.

In hierarchical systems, various functions described herein can be centralized in a control node such as a base station controller or access controller; distributed among like nodes such as base stations or access points; or distributed throughout the hierarchy in base stations and base station controllers. Also, the functions can be included in wireless terminals as well. However, a preferred embodiment relies on base stations or base station controllers to exchange information and instructions and can use wireless terminals in the manner designed for existing networks so as to avoid the need to update or modify existing wireless terminals or run a thin client on the terminals. For example, as certain of the below-described embodiments illustrate, the access points can be configured to instruct the wireless terminals to transmit known signals (such as pilot signals, for example); and can use existing control mechanism such as uplink power control. The systems can also be configured to take measurements of wireless terminal operations to make decisions to avoid, reduce or minimize interference. Other embodiments may place some of these control mechanisms on the wireless terminals or make other distribution of functionality than those examples described herein.

In peer-to-peer environments, coordination and control mechanisms can be assigned to and distributed amongst the various peer elements, or certain peers may be designated as super peers with additional control mechanisms over the other peers. Super peers can be identified, for example, when the network configuration is mapped and network neighbors identified.

Various innovations are described in this document in the context of an exemplary embodiment of the system, such as the example environment described above with reference to FIG. 3, which comprises multiple wireless access points, coupled to an access controller. The connections between the access points and the controller could be dedicated, or the access points and the controller could be coupled to one another via a switching network, such as a gigabit Ethernet network, for example. It should be noted that the innovations are also applicable to wireless system architectures that differ from the example environment and exemplary embodiments described herein, such as a completely distributed system that involves access points that can communicate between themselves in a peer-to-peer manner.

Figure 3:
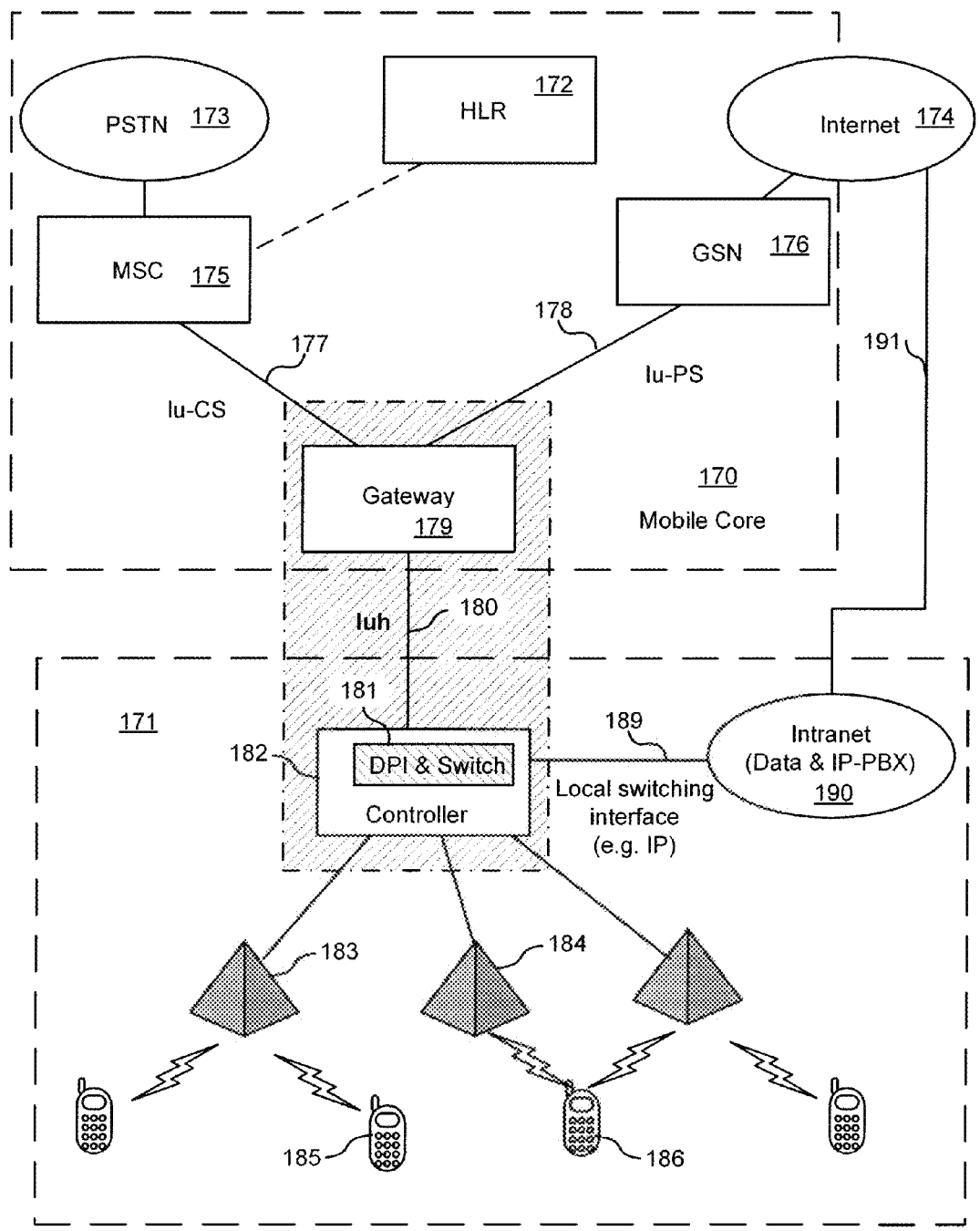
FIG. 3 is a diagram illustrating an example communication system in accordance with one embodiment of the invention.

FIG. 3 is a diagram illustrating an example communication system in accordance with one embodiment of the invention. The example illustrated in FIG. 3 depicts a cellular type of architecture, such as a femtocell or other cellular architecture, that includes a single access controller 114 that can be used to control and communicate with a plurality of access points 102, 104, 106, 108, 110 and 112. In this example, the access points 102, 104, 106, 108, 110, 112 are all wireless access points that communicate with a plurality of wireless terminals such as handsets, for example, or other wireless devices. Accordingly, the access points can each define a communication cell, an example of which can include a femtocell. To avoid excessive clutter in the drawings, only two cells 166, 168 are illustrated. Cell 1 166 illustrates an example coverage area for access point 102 and cell 2 168 illustrates an example coverage area for access point 104. As will be appreciated by one of ordinary skill in the art after reading this description, the other access points will also have corresponding areas of cell coverage.

The access points 102, 104, 106, 108, 110, 112 are communicatively coupled to access controller 114 by way of a backhaul 116. For example, in various embodiments, backhaul 116 can be implemented utilizing a communication network such as a packet-switched network. Likewise, alternative communication schemes or topologies can be implemented for backhaul 116. In some embodiments, access controller 114 is configured to coordinate or control at least some of the operations of at least some of the access points 102, 104, 106, 108, 110, 112. Likewise, access controller 114 can serve as a base station to relay communications among the access points 102, 104, 106, 108, 110, 112 (and ultimately their respective wireless terminals), as well as between the access points 102, 104, 106, 108, 110, 112 and their respective wireless terminals and other entities.

The access points 102, 104, 106, 108, 110, 112 are configured to communicate with wireless devices 118 . . . 140 within their respective cells. Such communications can comprise voice and data communications. Examples of wireless devices can include a cellular phone or other wireless terminal. Accordingly, at least some of the wireless terminals can be mobile devices that may move into and out of communication system 100 as well as within communication system 100. In FIG. 1, wireless terminals 118 . . . 120 are coupled to access point 102 via wireless links 142 . . . 144. Likewise, wireless terminals 122 . . . 124 are coupled to access point 104 via wireless links 146 . . . 148, and so on for the other access points 106, 108, 110, 112 as depicted in this example. In some embodiments, the geographical locations of the access points are known to the controller as well as to the access points.

Figure 2:
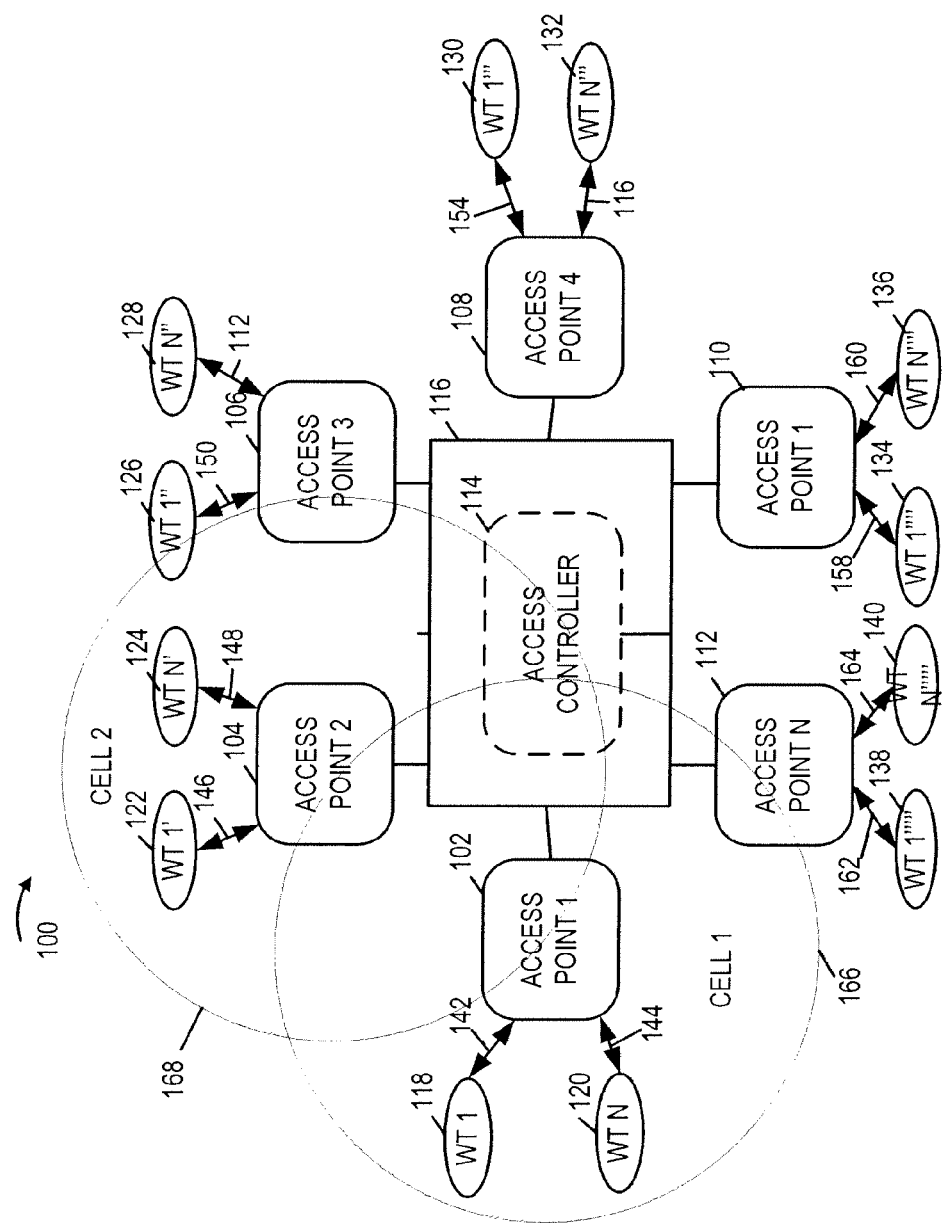
FIG. 2 is a diagram illustrating a simplified architecture for an example environment of the invention.

FIG. 2 generally depicts a cellular architecture in which a plurality of cells or access points are distributed to provide coverage cells to the multiple wireless terminals in the coverage areas. The access points are under control and coordination of the access controller. Accordingly, FIG. 2 can represent a number of different communication architectures such as a femtocell architecture and a macro cell architecture. The various embodiments discussed below are described in terms of the components and topology illustrated in FIG. 2. However, after reading these descriptions, it will be apparent to one of ordinary skill in the art how these embodiments can be implemented with other architectures.

FIG. 3 illustrates a deployed network controller implemented in accordance with an embodiment of the invention. In this embodiment a local network sector 171 comprises a control node 182, a local intranet 190, and a plurality of locally deployed femtocells, 183, 184, for example as further described with respect to FIGS. 1 and 2. Here, control node 182 comprises an access controller connected to a plurality of femtocells 183, 184 to enable a local cellular coverage for user equipment 185, 186. In Controller 182 is equipped with modules 181 that enable it to provide inspection and switching functions on data packets received from connected user equipment. This enables the controller 182 to mediate the local switching of certain traffic types between a mobile core network 170 and a local network 190. In other embodiment, control node 182 may be located in other network devices, such as access points, routers, or gateways.

Controller 182 provides access to the core network 170 via an interface 180 with a gateway node 179. For example, in the environment described with respect to FIG. 1, gateway 179 may comprise a HNB-GW, and interface 180 may comprise an Iu-h interface. In other embodiments, controller 180 may have connections to other core network elements, such as a GGSN. As a controller 182 received a packet-switched or circuit-switched communications from connected user equipment, the controller may route this information to the gateway 179. Once at the gateway, if the communication is circuit-switched it may be provided via an interface 177 to a switch node, such as a mobile switching center (MSC) 175. The mobile switching center 175 may then mediate the interaction with the public switched telephone network 173. If the communications are packet-switched, then the gateway may transmit them over interface 178 to a support node 176, such as a GSN, that can mediate the packet-switched communications with Internet 174. In other embodiments, the functionality provided by gateway 179 and controller 182 may be co-located at a single network element. For example, controller 182 may be provided with direct interfaces with the MSC 175 and a GSN 176 to allow the controller to transmit core network destined information, whether packet-switched or circuit-switched, to the proper network element. In still further embodiments, the functionality of other network elements may be combined. For example, a femtocell access point might also be provided with the functionality described with respect to the access controller. In such an example, the controller/femtocell may also maintain control over other femtocell access points in the network, or may be a standalone device.

Controller 182 is further configured to interface 189 with a local data network, such as intranet 190. For example, intranet 190 may provide access to local enterprise data sources, and may provide an interface to communicate with a local packet-based private branch exchange. Furthermore, as described with respect to FIG. 1, local intranet 190 may provide its own communications interface 191 with Internet 174, for example using a router/NAT firewall.

In some embodiments, controller 182 is provided with switching or routing modules 181 that allow it to reroute data communications from the user equipment 185 for 186 to various network elements. For example, in some embodiments bandwidth to the core network may be limited, whether because of cost or availability, such that reduction of redundant or unnecessary network communications may improve the quality of network medications that are required to take place via the core network 170. In the illustrated embodiment, the controller 182 may avoid using the core network for certain types of communications by switching those communications to the local interface 189. In further embodiments, the controller is equipped with packet inspection modules 181 to allow it to inspect a packet or a group of packets to determine whether those packets should be routed to the mobile core 170 or to the local intranet 190. For example, the packet inspection and switch modules 181 may be used by the controller 182 to implement the methods described with respect to FIGS. 4 and 5 below.

Figure 4:
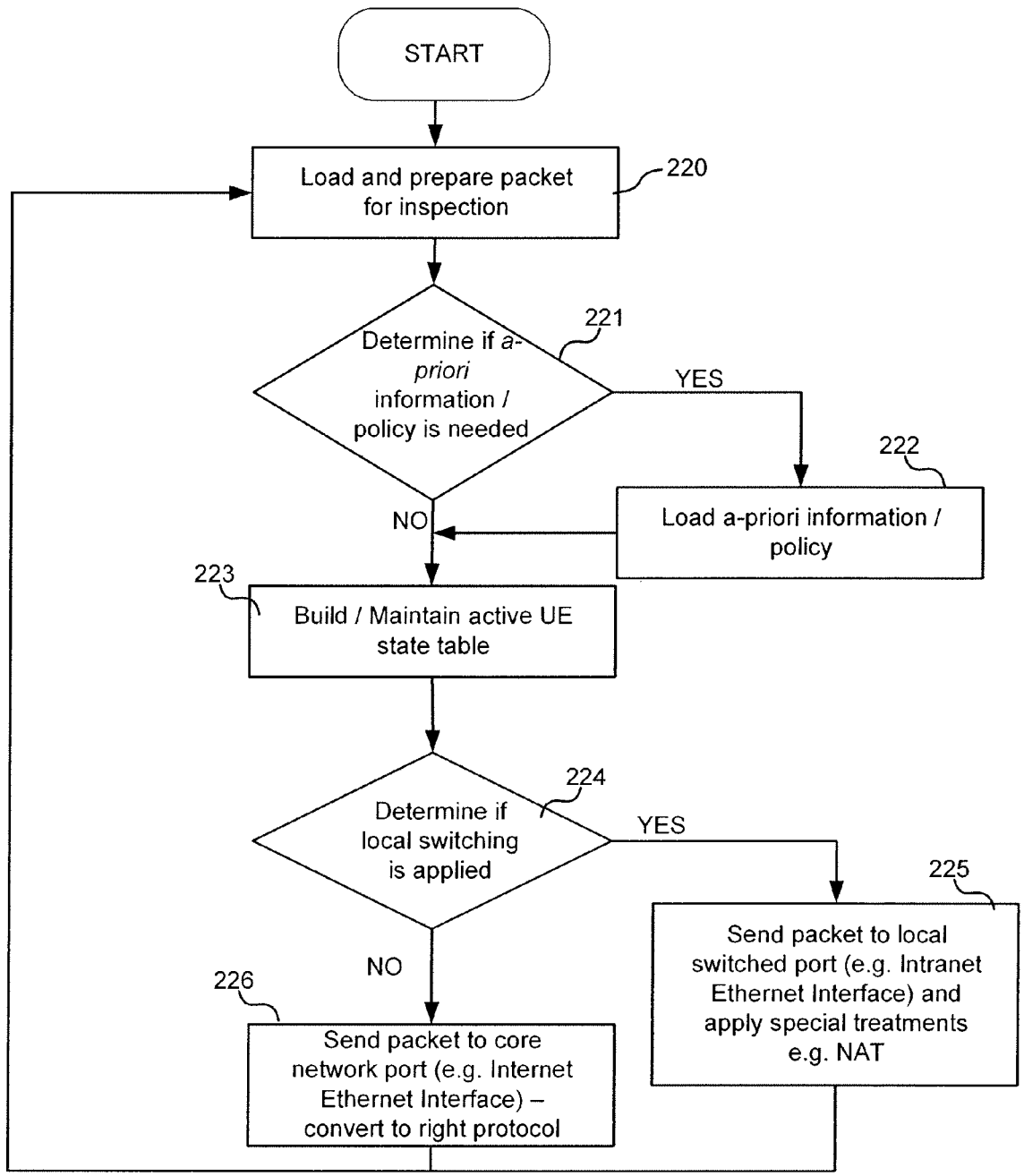
FIG. 4 illustrates a method for local switching according to an embodiment of the invention.

FIG. 4 illustrates a method of packet switching according to an embodiment of the invention. In some embodiments, this method may be performed by a femtocell access controller, for example as described with respect to FIG. 3, or in other embodiments may be performed by any other currently configured network element. In the illustrated embodiment, the access controller receives a packet 220 and prepares it for packet inspection.

In some embodiments, an access controller is configured to maintain a register or table of connected user equipment and various state parameters for the connected devices. In some deployments, different types of users may connect to a local femtocell network. These different user types may be provided with different privileges for access to the network. For example, a first user equipment may be allowed to utilize the femtocell network for cellular communications, but it may not be allowed to utilize the enterprise local intranet for a packet-switched communications. In further embodiments, different priorities or privilege levels may be provided to different devices. For example, a first class of authorized devices may have access to both the femtocell cellular network and certain services within the local intranet. For example, the first class of authorized devices might have access to the local connection to the Internet, and access to a local IP-PBX system. Further classes of authorized devices may have different access credentials. For example, a second class of authorized device might have access to all services provided to the first class, and additionally other services such as access to local intranet data servers.

In such embodiments, predetermined information or policies may be used to provide certain thresholds for packet management. In some embodiments, these policies may be determined by a system manager and loaded onto the access controller. For example, a system manager may load a white list of authorized user equipment which are able to use the local network for data switching. The access controller may then match received packets to this white list to determine if further packet inspection is necessary. In other embodiments, the policies may be provided by a service provider or other entity, for example to provide system interoperability. For example, a service provider may provide policies such that all packets a certain type or destined for a certain address are routed to the core network. In the illustrated embodiment, after the current packet is loaded 220, the access controller determines if such a policy 221 should be used for the current packet. For example, the access controller could inspect various easily determinable packet characteristics to determine if such a policy should be applied to the current packet. For example, such characteristics might comprise various information derived from packet headers such as the identity of the transmitting device, the port number used, or the packet destination. If the access controller has been programmed with any policies that apply to these characteristics, then this policy may be loaded 222 for further system use. In a particular embodiment, a predetermined policy may be provided such that any packet destined for a particular port is automatically routed to the core network. Accordingly, the step 221 would comprise inspecting the packet to determine if it is destined for the particular port, and if so, then loading the policy 222 to ensure that the packet is forwarded to the core network.

Whether or not a predetermined switching or forwarding policy is loaded, the access controller builds or maintains a state table 223 for active user equipment. This state table may comprise information describing past and current behaviors of the particular user equipment transmitting the packet. This state table might include information such as information from previously transmitted packets, such as previous packet destinations, previous packets source ports, sequential packet numbers, or session identifiers. The state table might also comprise other information regarding the state of the particular user equipment, such as information regarding the location of the user equipment, e.g. which femtocell access points is connected to, previous or currently scheduled mobility information, particular settings enabled on the user equipment, or other similar information. For example, the access controller may use the state table to determine if the user equipment is maintaining a particular session with some network service. For example, a user equipment may have a preference to send data over a local intranet if available, and may transmit this preference to the access controller, or the access controller may have a record of the user equipment moving towards the boundary of the femtocell network and can thereby predict that the user equipment will soon be performing a handover to an external macrocell network.

In some cases, the predetermined policy, or the state table, may dictate that the packet should be locally switched or allowed to continue to the core network. In these cases, further packet inspection may not be necessary, and locally switching may be applied 224 to send the packet to the local intranet 225, or to the core network 226 accordingly. In other cases, these policies in states tables may be used to guide various other decision processes that are used to determine if the packet should be locally switched 224. Some examples of such decision processes are described in further detail with respect to FIG. 5.

In some embodiments, if the packet is transmitted to the local intranet 225, then the access controller may simply transmitted on the appropriate predetermined local switched port. In other embodiments, the access controller may be configured to provide other functions, such as routing functions, packet routing functions, or network address translation procedures. Accordingly, depending on the destination of the locally switched packet, various procedures may be performed on the packet. For example, if the packet is destined for the Internet, then NAT procedures can be performed on the packet to allow proper reception of return packets, or if the packet is destined for a IP PBX, then packet wrapping may be performed to enable the packet to be properly received by the IP PBX system.

Similarly, in some cases switching the packet to the network core 226 may comprise transmitting the packets over a core network port. In further embodiments, the access controller may be configured to perform various protocol conversion to allow proper transmission of the packet over the core network. For example, if the gateway and access controller or collocated, as described with respect to FIG. 3, then the access controller might convert the packet for transmission over the interface to the GGSN. In embodiments employed in a UMTS network, this might comprise converting the packet for the Iu-PS interface for transmission to the GSN.

Figure 5:
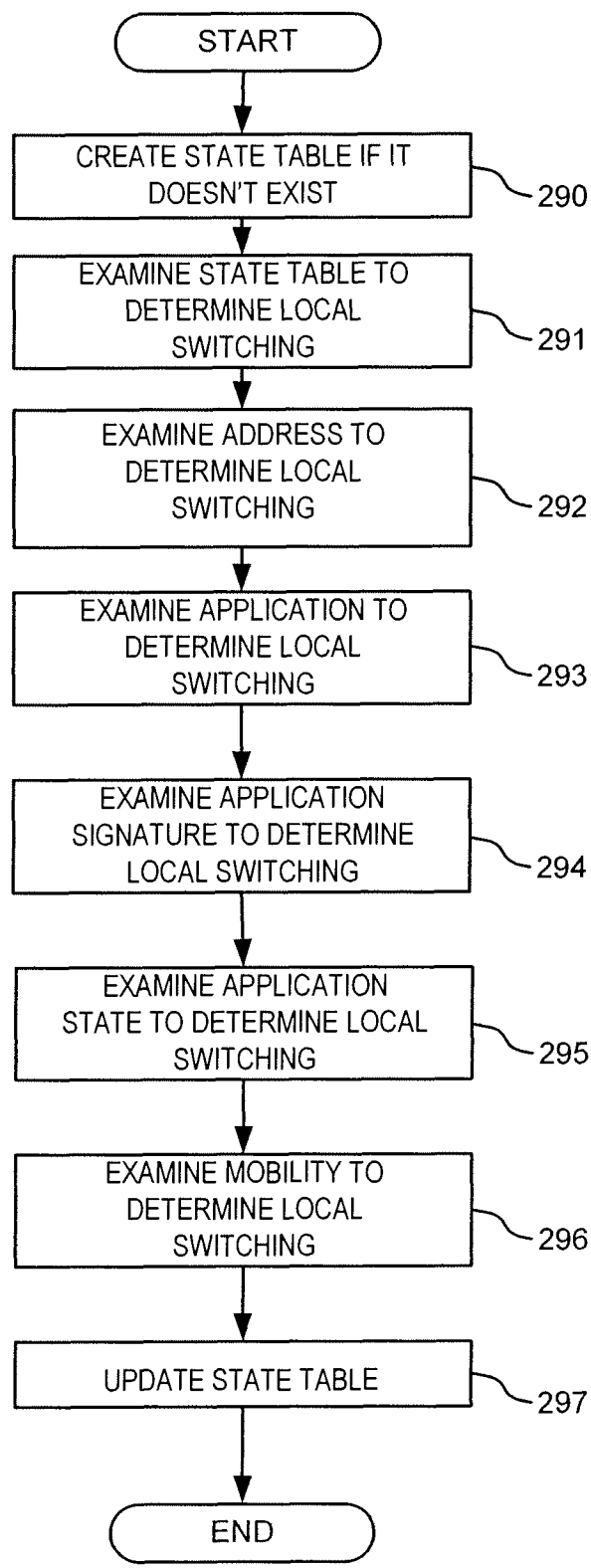
FIG. 5 illustrates a method for packet inspection according to an embodiment of the invention.

FIG. 5 illustrates a more detailed method of determining local switching behavior according to an embodiment of the invention. The illustrated method describes the functions performed in steps 223 and 224 of FIG. 4 in greater detail. In step 290, if a state table for the source user equipment does not exist, then the access controller creates it. In some embodiment, this may comprise updating a state table for the source user equipment with user information such as location of the source device, and packet information, such as source, destination, port, application, sequential packet number, and so on.

In step 291, the access controller examines the state table to determine if local switching should be implemented. As described herein, various state table characteristics may be used to determine if the packet should be locally switched. In particular embodiment, the state table allows the access controller to heuristically locally switch received packets. In some embodiments, these heuristics may be developed based on the user equipment's state history. Accordingly, an initial inspection may determine if the state table has stored sufficient history to allow for local switching. For example, if a state table were created in step 290 then it may not have sufficient information to perform further inspection methods. Accordingly, if the state table does not have sufficient information, the method may transmit the packet on the core network and proceed to the next packet. In other embodiments, other state table characteristics may be useful for determining local switching. For example, the state table may indicate if the user equipment is on a predetermined white list, and if so allow the method to proceed to further packet inspection methods. As another example, the state table may have a stored entry indicating that the user equipment is conducting a data exchange session, such as a VoIP session, with a particular local service. The entry may further indicate that the previous packet of this session was locally switched, and that therefore the current packet may be locally switched, thereby avoiding the requirement to repeat packet inspection methods. In further embodiments, the state table may be used to providing weightings to whether or not a packet will be locally switched. For example, the user equipment state may indicate a higher probability that the packet should be locally switched, but further packet inspections may be used in the final determination. In still further embodiments, other methods of aggregating packet characteristics may be employed. For example, rather than state tables based on specific user equipment, state tables may be configured according to common destinations, or commonly used applications.

Packet characteristic inspection begins with step 292 where the address field of the packet header is inspected to determine if local switching should take place. The packet header may be inspected to determine address information, which may be used in the local switching determination. For example, if the packet has a local network destination, such as a local server or PBX system, then the packet may be automatically locally switched to avoid congesting the connection to the core network. In still further embodiments, local switching may be used to direct traffic to external networks that would otherwise be transmitted along the core network. For example, as described herein, the access controller may have available routes to the interne that do not involve the core network, for example through the local intranet. In these embodiments, if the address is for an Internet server, then the packet may be locally switched. Or, in other embodiments, the address can increase the probability of local switching, while allowing other determination steps to impact the final decision. For example, if a session is currently being established with an Internet service, then session establishment packets may be transmitted along the core network, and once the session is established, packets may be transmitted along the local network.

In step 293, the application related to the packet can be examined to determine if local switching should take place. For example, a user equipment may run a variety of different applications that communicate using packet-switched traffic, for example e-mail clients, calendars, or web browsers. In some embodiments, traffic originating from different applications may be treated differently. For example, a network provider may require that all e-mail traffic be sent over the core network. Accordingly, the packet may be inspected to determine if the packet was generated by the e-mail client and if so, provide the packet to the mobile network and proceed to the next packet. In some cases, application information may not be readily available for each packet. In such a case, the state table might be used to provide an indication of the likelihood that a particular packet was generated by a particular application. For example, if the state table indicates that the user equipment has an ongoing e-mail data transfer session, then all packets received while the indication is present may be automatically forwarded to the core network. As another example, a user equipment may be equipped with an VoIP application that allows voice calls to take place using an IP-based network. If a packet is received that was generated by such an application, then it may be automatically switched to the local intranet, for transmission to a local device, if the VoIP application is a local IP-PBX type system, or to the internet, accordingly.

In some situations, a packet's corresponding application may not be readily apparent from the packet. For example, a packet's payload may be encrypted, such as in a virtual private link. Accordingly, in some embodiment, the access controller is configured to inspect packet characteristics to determine an application signature 295 to determine if local switching should be implemented. Such application signatures comprise characteristic present in a packet, for example, in the packet header, that provide some indication of an application source for the packet. For example, a port number, or a sequential packet number. In these cases, the access controller can inspect the state table to determine if multiple packets have been transmitted from a particular port, or with sequential packet numbers, and may switch the current packet accordingly. For example, the access controller may inspect the state table and determine that all packets from port n are locally transmitted, even those packets that are not encrypted. Accordingly, the access controller may use port n as a signature for packets that should be locally switched.

The access controller may also perform step 295 to determine an application state to determine whether to implement local switching. In some embodiments, whether local switching may be employed may vary according to application state. For example, it may be preferable to establish and end sessions using traffic over the core network, while it is acceptable to transmit actual session data using traffic over the local network. Or as another example, an application that otherwise communicates with the Internet may receive setting updates or other updates from the core network. In these embodiments, the access controller may determine an application state by inspecting packet characteristics, such as payload or header contents, to determine whether to perform local switching.

In some embodiments, local switching may be preferred when a user equipment will remain in the local femtocell network until a return packet arrives or a data session ends. In other words, if local switching is used for an outgoing packet, and the user equipment leaves the network, or is in the process of leaving the network, the return packet may be lost, or current data sessions may be interrupted if a locally switched data session is taking place when the user equipment leaves the network. In these embodiments, the access controller is configured to perform step 296 to determine packet characteristics that indicate user equipment mobility. For example, if the current packet or previous packets indicate that the user equipment is communicating with the HLR in anticipation of an impending handover procedure, the access controller may transmit all packets to the core network. Alternatively, if the mobility information indicates that the user equipment will likely remain in the network, then the controller may perform a local switching operation. For example, if the user equipment state table indicates that the user equipment is connected to a femtocell that is known to be located centrally in the environment, then it is likely the user equipment will remain in the network, and the current packet may be locally switched.

In step 297, the state table is updated with information gained from during the packet inspection process. Accordingly, information gained during the current packet inspection process may be used in future packet inspection processes to determine if future packets should be locally switched. For example, if the current packet is the last packet of the establishment of a data session, then the access controller might have determined to transfer the current packet to the core network in step 295. However, the state table may be updated to indicate that the session has now been established, so that future packets from that application, or having that application signature, may be locally switched. As another example, if the user equipment were performing an incoming handover procedure from a macrocell to the femtocell network, then the access controller may have determined to transfer the current packet over the core network in step 296. However, the state table for the incoming user equipment may be updated with the new mobility information so that future packet traffic may be locally switched.

As described herein, the typical default operation is to transmit an incoming packet to the mobile provider's core network. This represent a cautious "err on the side of core" approach that may be used to ensure system operability. As typical mobile providers' network are currently configured to receive all packet-switched data from user equipment, transmitting data to the core network be default allows the service provider network to continue providing packet-switched communication services to connected user devices. This use of the core network is then reduced by inspecting packets in the context of a transmitting user equipment's state to determine if the packet may be locally switched. Accordingly, the methods described herein may be performed in a manner that is transparent to the connected user equipment and the systems described herein may operate without requiring system-specific software to be installed on the user equipment.

Figure 6:
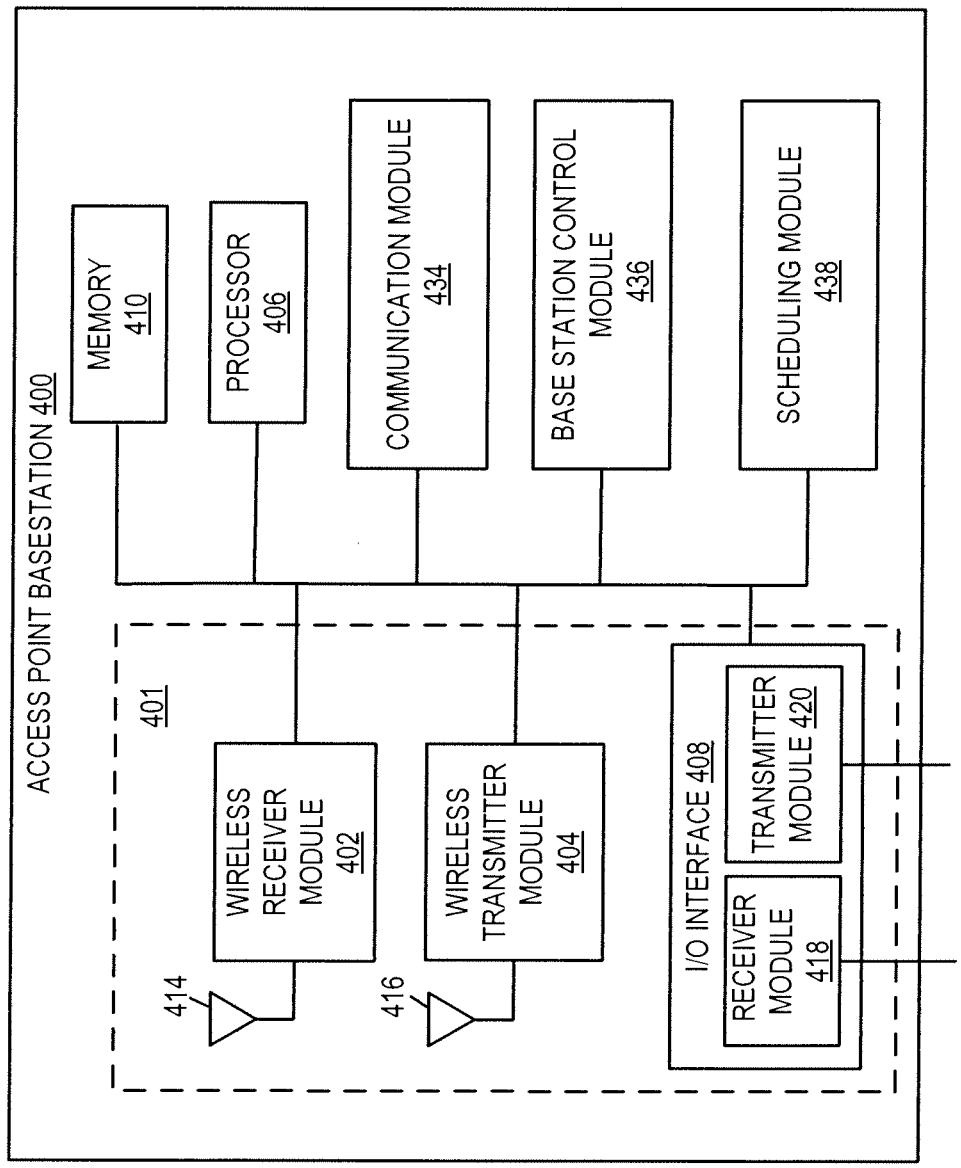
FIG. 6 is a diagram illustrating a block diagram for an example wireless access point or base station in accordance with one embodiment of the invention.

FIG. 6 is a diagram illustrating a block diagram for an example wireless access point or base station in accordance with one embodiment of the invention. In particular, the example architecture illustrated in FIG. 6 shows an embodiment of an access point architecture configured to transmit and receive messages to and from an access point controller over a communication link such as a backhaul, and configured to transmit and receive messages to and from UEs or other wireless terminals.

In this example architecture, the access point 400 includes a communication module 401, a processor 406, and memory 410. These components are communicatively coupled via a bus 412 over which these modules may exchange and share information and other data. Communication module 401 includes wireless receiver module 402, a wireless transmitter module 404, and an I/O interface module 408.

An antenna 416 is coupled to wireless transmitter module 404 and is used by access point 400 to wirelessly transmit downlink radio signals to wireless terminals with which it is connected. These downlink RF signals can include voice and data communications sent to the wireless terminals registered with the access point 400 to allow routine communication operations of the cell. The downlink RF signals can also include control signals such as, for example, uplink power control signals that are sent to registered wireless terminals to allow access point 400 to control the uplink transmit power of the wireless terminals that are communicating with access point 400 as a point of attachment to the cell.

Antenna 414 is included and coupled to wireless receiver module 402 to allow access point 400 to receive signals from various wireless terminals within its reception range. Received signals can include voice and data communications from a wireless terminal in the access point's cell coverage area for routine communication operations. Accordingly, signals such as wireless uplink signals from registered wireless terminals that have a current connection with access point 400 are received. Also, access point 400 typically receives various housekeeping or control signals from wireless terminals such as an uplink pilot signal, for example.

Although two antennas are illustrated in this and other example architectural drawings contained herein, one of ordinary skill in the art will understand that various antenna and antenna configurations can be provided as can different quantities of antennas. For example, transmit and receive functions can be accommodated using a common antenna or antenna structure, or separate antennas or antenna structures can be provided for transmit and receive functions as illustrated. In addition, antenna arrays or other groups of multiple antennas or antenna elements, including combinations of passive and active elements, can be used for the transmit and receive functions.

An I/O interface module 408 is provided in the illustrated example, and can be configured to couple access point 400 to other network nodes. These can include nodes or equipment such as, for example, other access points, and an access controller. In this example architecture, the I/O interface module 408 includes a receiver module 418 and a transmitter module 420. Communications via the I/O interface module can be wired or wireless communications, and the transmitter and receiver contained therein can include line drivers and receivers, radios, antennas or other items, as may be appropriate for the given communication interfaces. Transmitter module 420 is configured to transmit signals that can include voice, data and other communications to the access controller. These are typically sent in a standard network protocol specified for the cellular backhaul.

Receiver module 418 is configured to receive signals from other equipment such as, for example, other access points (in some embodiments, via the access controller), and an access controller. These signals can include voice, data and other communications from the access controller or other equipment. These are typically received in a standard network protocol specified for the cellular backhaul.

Memory 410, can be made up of one or more modules of one or more different types of memory, and in the illustrated example is configured to store data and other information 424 as well as operational instructions such as access point control routines 422. The processor 406, which can be implemented as one or more CPUs or DSPs, for example, is configured to execute instructions or routines and to use the data and information 424 in memory 410 in conjunction with the instructions to control the operation of the access point 400. For example, access point control routines can include instructions to enable processor 406 to perform operations for transferring data between wireless terminals and the access point controller, and for managing communications with and control of wireless terminals.

Accordingly, a communication module 434 can be provided at a femtocell access point to manage and control communications received from other network entities such as a femtocell controller or other access point basestations, and to direct appropriate received communications to their respective destination wireless terminals. Likewise, communication module 434 can be configured to manage received communications from wireless terminals and direct them to their next destination such as, for example to the femtocell controller for transfer to the core network. Communication module 434 can be configured to manage communication of control information sent to and received from wireless terminals. As such, communication module 434 can manage wireless communications such as uplink and downlink communications with wireless terminals as well as wired communications such as those conducted over the Ethernet (or other) backhaul.

A base station control module 436 can be included to control the operation of access point base station 400. For example, the station control module 436 can be configured to implement the features and functionality described above for communicating and transferring information among wireless terminals, other femtocells, and a femtocell controller. A scheduling module 438 can also be included to control transmission scheduling or communication resource allocation. Information that is used by base station control module 436 and scheduling module 430 can also be included in memory 410 such as entries for each active mobile node or wireless terminal, which lists the active sessions conducted by a user and can also include information identifying the wireless terminal used by a user to conduct the sessions.

Figure 7:
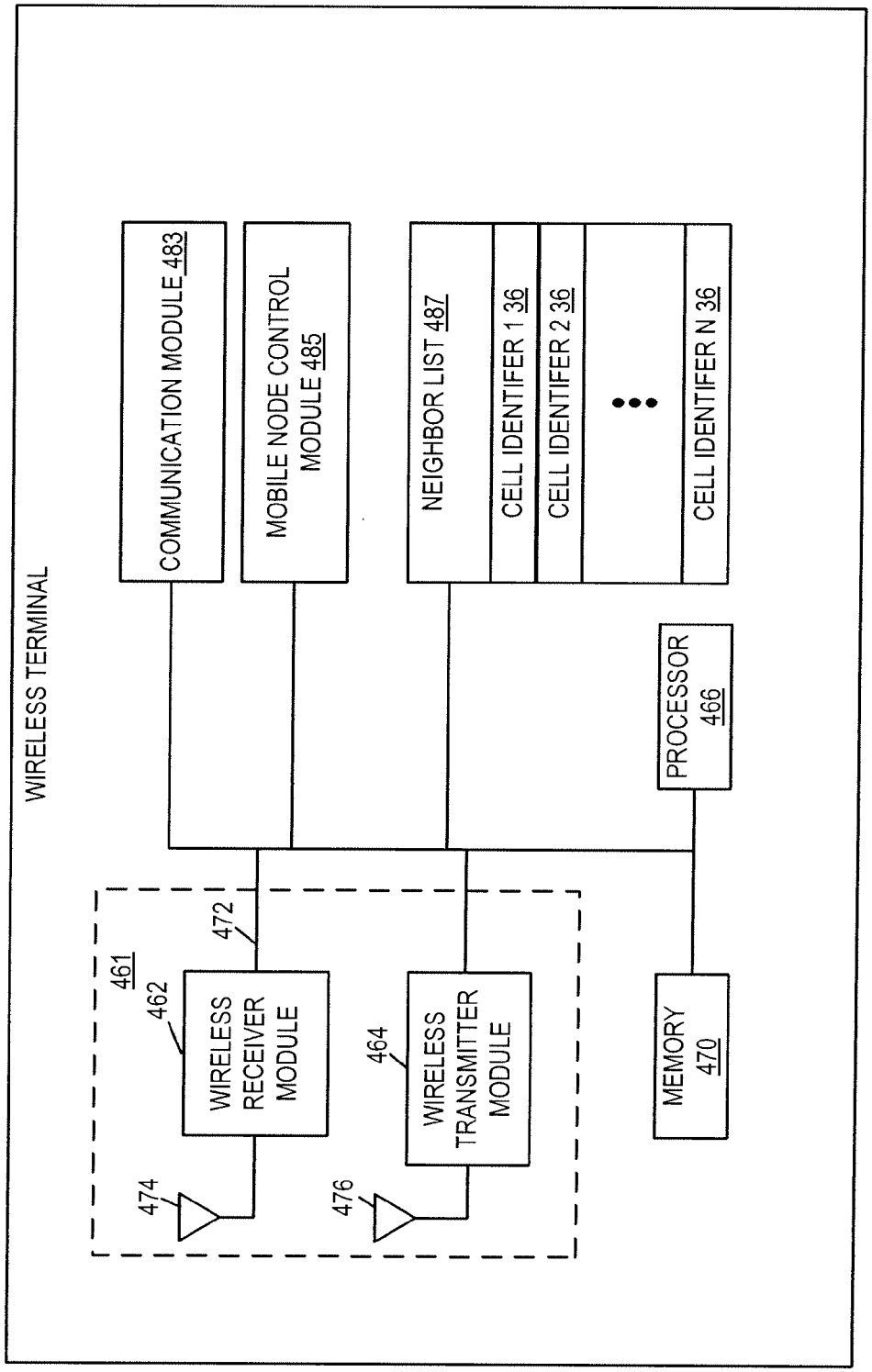
FIG. 7 is a diagram illustrating an example architecture for a wireless handset in accordance with one embodiment of the invention.

FIG. 7 is a diagram illustrating an example architecture for a wireless terminal in accordance with one embodiment of the invention. Referring now to FIG. 7, wireless terminal also includes a communication module 461 similar to communication module 701 contained within the example access point. The communication module eight of one enables the wireless terminal to communicate voice and data information as well as control information with its serving access point. Accordingly, user information such as voice and data traffic can be communicated between the wireless terminal and the access point and ultimately between the wireless terminal and other devices (such as, for example, the core network) for routine device operations. Likewise, the communication module can be configured to receive control information from the access point to control the wireless terminal to perform desired operations can transmit data, infrastructure, or other control information such as pilot signals, scrambling codes, and so on.

Processor 466 and memory 470 are also typically included in the can be utilized to perform device functions of the wireless terminal. Various modules can be included to perform device operations, both routine wireless terminal device operations as well as specific operations described above for network monitoring and reconfiguration. These can include a communications module 483 and a mobile node control module 485. For example, mobile node control module 485 can be configured to control handoff processes in conjunction with the neighbor list 487.

Although not illustrated, user, device and session resource information can be stored in memory 470 to facilitate operations. Also illustrated is a neighbor list 487 that can be stored in memory 470 or otherwise stored or maintained on the wireless terminal. Neighbor list 487 includes one or more cell identifiers, such as cell identifiers 36, that can be used for operations such as handoff operations.

Figure 8:
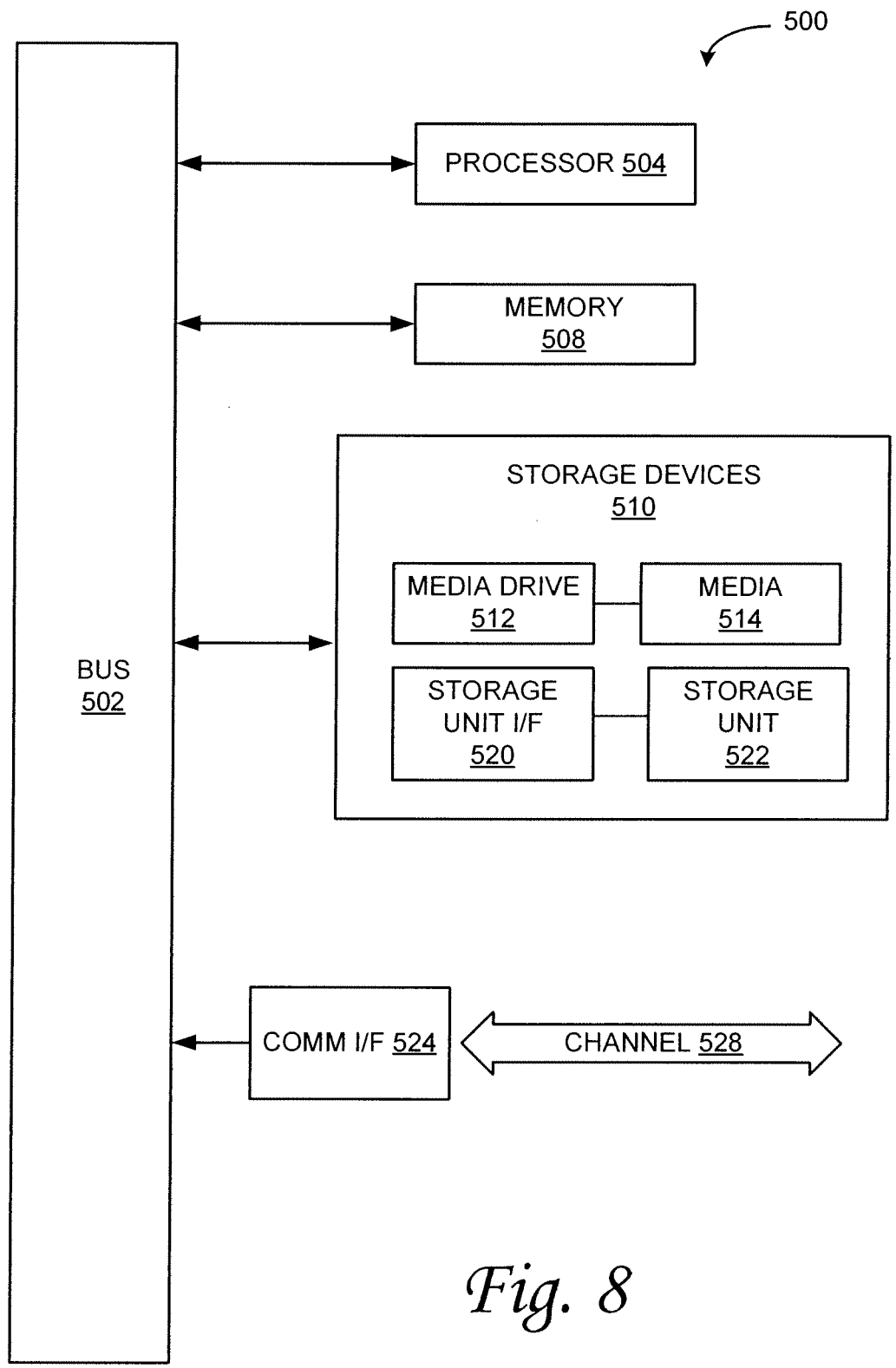
FIG. 8 is a diagram illustrating an example computing module in accordance with one embodiment of the invention.

As used herein, the term module can describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 500. After reading this description, it will become apparent to a person skilled in the relevant art how to implement the invention using other computing modules or architectures.

Referring now to FIG. 8, computing module 500 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514 might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in ten is of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for communicating packet traffic from an access point to a destination node, the method comprising:
   receiving a packet from a wireless terminal at a control node in a network, the packet including data from the wireless terminal in the network;
   aggregating the packet with a plurality of other received packets;
   determining, based on packet characteristics, whether the packet is to be routed to a mobile communication service provider network or to a local intranet, wherein the determining comprises making a routing decision based on the aggregation of packets; and when the packet is to be routed to the local intranet, routing the packet directly to the local intranet, bypassing the mobile communication service provider network and any IP gateways configured to provide connectivity to the local intranet via the mobile communication service provider network, wherein a direct link between the control node and the local intranet is utilized for routing the packet to the local intranet, wherein the method further comprises:
determining whether the first wireless terminal is in a handoff mode and if so, routing the packet to the mobile communication service provider network without examining the packet characteristics.

2. The method of claim 1, wherein the packet characteristics comprise packet state and packet signature.

3. The method of claim 1, wherein determining comprises evaluating examined packet characteristics based on prior received and examined packets from the wireless terminal, and wherein, in a case where a most recently received packet is to be routed directly to the local intranet, a currently received packet is also routed directly to the local intranet.

4. The method of claim 1, further comprising:
based on the aggregating, applying a weighting value to the packet and the plurality of other received packets with respect to whether or not the packet and the plurality of other received packets are to be locally switched.

5. The method of claim 1, further comprising when the packet is routed to the local intranet, determining whether the packet is destined for the Internet; and if so reconfiguring the packet such that the packet is routed from the local intranet to the Internet,
wherein the reconfiguring of the packet comprises performing packet wrapping to enable the packet to be properly received by the local intranet.

6. The method of claim 1, wherein the control node comprises a femtocell access controller.

7. The method of claim 1, further comprising:
determining a type of the packet to be routed; and
based on the determining of the type of the packet to be routed, either routing the packet to the mobile communication service provider network by the control node or bypassing the mobile communication service provider network and routing the packet to the local intranet through a local interface of the control node.

8. The method of claim 1, further comprising:
determining a type of a first user connected to the network;
based on the type of user, obtaining privilege information of the first user; and
based on the privilege information, routing packets to and from the first user using one of the mobile communication service provider network or the local intranet.

9. The method of claim 1, further comprising:
based on access information regarding predetermined policies; determining thresholds to be used for packet management within the network,
wherein the predetermined policies are derived from header information within packets and include information regarding how packets of a particular type are to be routed within the network.

10. The method of claim 1, further comprising:
building a state table for each active user equipment on the network, the state table including information of past and current behaviors of each active user equipment on the network, the state table further including location information of each active user equipment; and
determining whether a user device-transmitted packet or a user-destined packet is to be locally switched or to be sent over the network.

11. The method of claim 1, further comprising:
determining whether the packet is destined for the Internet of a Private Branch Exchange;
if the packet is destined for the Internet, performing NAT procedures to allow for proper reception of return packets; and
if the packet is destined for the Private Branch Exchange, wrapping the packet to enable the packet to be properly received by the Private Branch Exchange.

12. The method of claim 1, further comprising:
determining an application related to the packet;
based on the determining of the application related to the packet, either routing the packet via a local switch to the mobile communication service provider network or routing the packet to the local network and bypassing the communication service provider network.

13. The method of claim 1, further comprising:
determining an application state related to the packet;
based on the determining of the application state related to the packet, either routing the packet via a local switch to the mobile communication service provider network or routing the packet to the local intranet and bypassing the mobile communication service provider network,
wherein packets related to session establishment and session ending are routed to the mobile communication service provider network, and all other packets are routed via the local intranet.

14. The method of claim 1, further comprising:
receiving an indication as to whether or not an impending handover will occur with respect to the wireless terminal; and
routing all packets to the mobile communication service provider network if an impending handover will occur; and
routing all packets via the local intranet if an impending handover will not occur.

15. The method of claim 1, further comprising:
storing information regarding a routing decision performed on the packet,
based in part on the stored information regarding the routing decision performed on the packet, determining whether or not future packets destined for or output from the wireless terminal are to be routed via the local intranet or via the mobile communication service provider network.

16. In a cellular communication network having a plurality of access points serving wireless terminals, a control node having a non-transitory computer readable medium having computer program code embodied therein for enabling the control node to communicate packet traffic from an access point to a destination node, the communication comprising:
receiving a packet from a wireless terminal at a control node in the network, the packet including data from the wireless terminal in the network;
aggregating the packet with a plurality of other received packets;
determining, based on packet characteristics, whether the packet is to be routed to a mobile communication service provider network or to a local intranet, wherein the determining comprises making a routing decision based on the aggregation of packets; and when the packet is to be routed to the local intranet, routing the packet directly to the local intranet, bypassing the mobile communication service provider network and any IP gateways configured to provide connectivity to the local intranet via the mobile communication service provider network, wherein a direct link between the control node and the local intranet is utilized for routing the packet to the local intranet, wherein the determining comprises evaluating examined packet characteristics based on prior received and examined packets from the wireless terminal, wherein, in a case where a most recently received packet is to be routed directly to the local intranet, a currently received packet is also routed directly to the intranet.

17. The control node of claim 16, wherein the communication further comprises determining whether the first wireless terminal is in a handoff mode and if so, routing the packet to the mobile communication service provider network without examining the packet characteristics.

18. The control node of claim 16, wherein the packet characteristics comprise packet state and packet signature.

19. The control node of claim 16, wherein the communication further comprises:

based on the aggregating, applying a weighting value to the packet and the plurality of other received packets with respect to whether or not the packet and the plurality of other received packets are to be locally switched.

20. The control node of claim 16, wherein the communication further comprises when the packet is routed to the local intranet, determining whether the packet is destined for the Internet; and if so reconfiguring the packet such that the packet is routed from the local intranet to the Internet, wherein the reconfiguring of the packet comprises performing packet wrapping to enable the packet to be properly received by the local intranet.

21. The control node of claim 16, wherein the control node is further configured to control access to the operations of a femtocell, and wherein the wireless terminal connects to the femtocell.

22. A system of femtocells coupled to a control node having a computer readable medium having computer program code embodied therein for enabling the control node to communicate packet traffic from an access point to a destination node, the communication comprising:

receiving a packet from a wireless terminal at a control node in a network, the packet including data from the wireless terminal in the network;

aggregating the packet with a plurality of other received packets;

determining, based on packet characteristics, whether the packet is to be routed to a mobile communication service provider network or to a local intranet, wherein the determining comprises making a routing decision based on the aggregation of packets; and when the packet is to be routed to the local intranet, routing the packet directly to the local intranet, bypassing the mobile communication service provider network and any IP gateways configured to provide connectivity to the local intranet via the mobile communication service provider network, wherein a direct link between the control node and the local intranet is utilized for routing the packet to the local intranet, wherein the communication further comprises:

based on the aggregating, applying a weighting value to the packet and the plurality of other received packets with respect to whether or not the packet and the plurality of other received packets are to be locally switched.

23. The system of femtocells of claim 22, wherein the communication further comprises determining whether the first wireless terminal is in a handoff mode and if so, routing the packet to the mobile communication service provider network without examining the packet characteristics.

24. The system of femtocells of claim 22, wherein the packet characteristics comprise packet state and packet signature.

25. The system of femtocells of claim 22, wherein determining comprises evaluating examined packet characteristics based on prior received and examined packets from the wireless terminal, wherein, in a case where a most recently received packet is to be routed directly to the local intranet, a currently received packet is also routed directly to the intranet.

26. The system of femtocells of claim 22, wherein the communication further comprises when the packet is routed to the local intranet, determining whether the packet is destined for the Internet; and if so reconfiguring the packet such that the packet is routed from the local intranet to the Internet, wherein the reconfiguring of the packet comprises performing packet wrapping to enable the packet to be properly received by the local intranet.

27. The system of femtocells of claim 22, wherein the control node comprises a femtocell access controller.

* * * * *